June 7, 1949.  H. L. TURNER  2,472,319
MAGNETIC GAUGE FOR CONDUITS
Filed Dec. 7, 1944  2 Sheets-Sheet 2
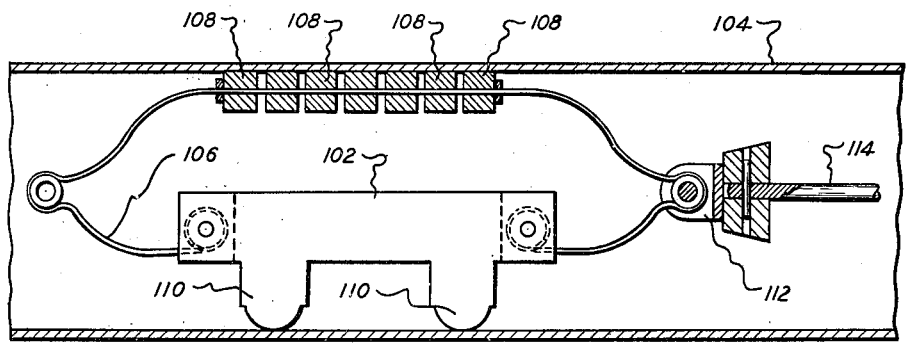
Fig_3_
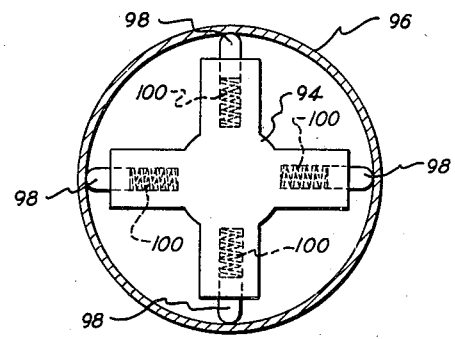
Fig_4_
Inventor
HOWARD L. TURNER
By Beaman + Langford
Attorneys Patented June 7, 1949

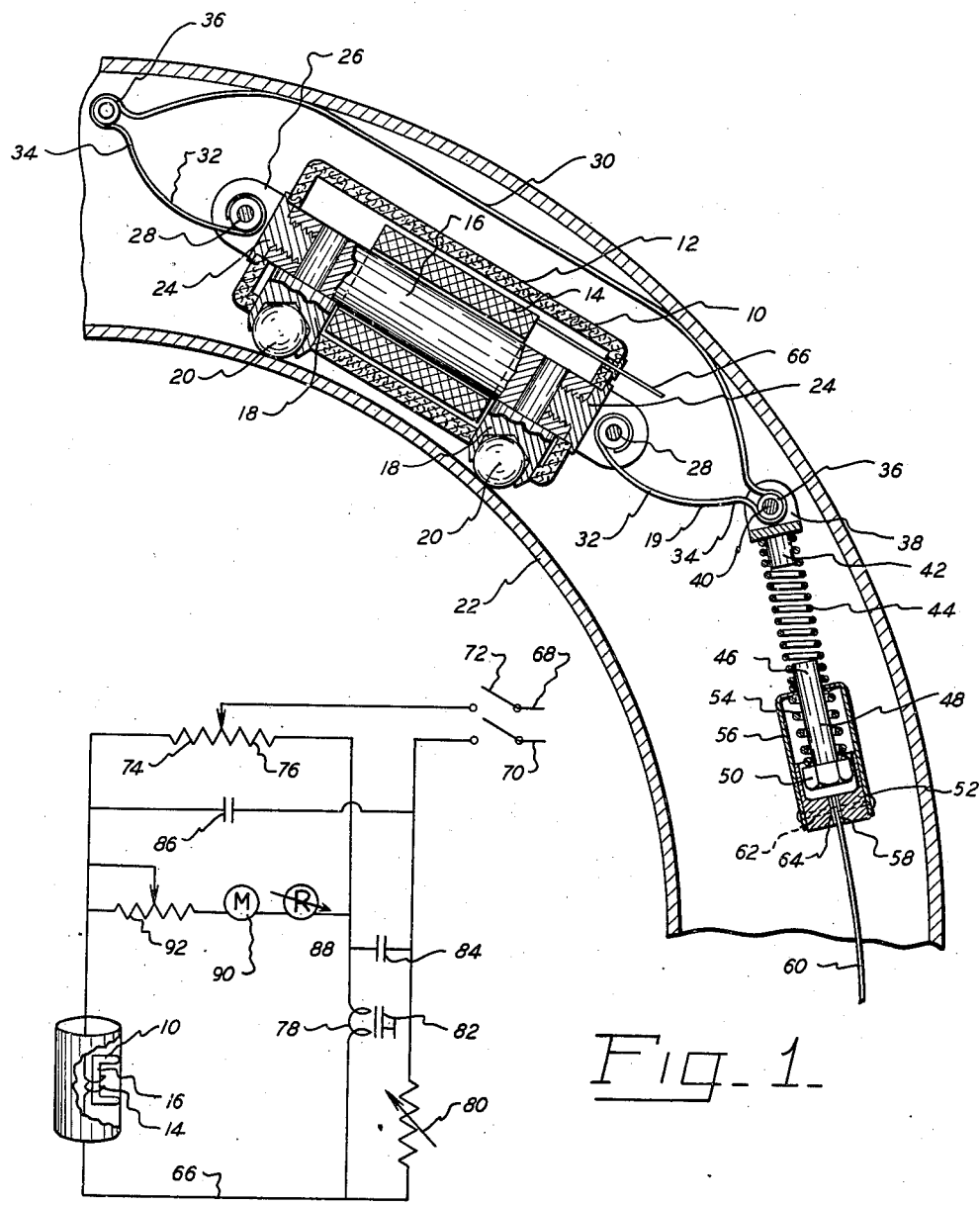

2,472,319

UNITED STATES PATENT OFFICE 2,472,319

MAGNETIC GAUGE FOR CONDUITS

Howard L. Turner, Jackson, Mich.

Application December 7, 1944, Serial No. 567,105

1 Claim. (Cl. 175—183)

My invention relates to a method and device for the examination of the insides of metallic tubes or conduits, particularly where the inner surface undergoes some change during a period of service or use.

Any deposit built up on the inner surface of a tube or conduit, or any change in the surface structure of a conduit, may seriously impair the usefulness of said conduit. Scale or corrosion on the inner surface of a boiler tube or other heat transfer apparatus, for example, can be quickly and easily located with my device. High rates of heat liberation or improper circulation frequently cause local depositing of either magnetic or nonmagnetic scale in a bent tube or water wall in a boiler causing unexpected failure. No previous method of examination has heretofore proved satisfactory for determining the extent or exact location of such defects.

An object of my invention is to provide a simple method for determining the amount or thickness of deposit on the surface of a tube or duct whether the tube be a bent tube or straight and whether the material deposited or formed on the surface of the tube is magnetic or nonmagnetic.

Another object of my invention is to provide a device to detect and locate corrosion or erosion of a tube or conduit in order that the progress of corrosion or erosion may be arrested, or if serious the damaged section be cut out and replaced without the necessity of replacing a whole tube or bank of tubes.

Other objects of this invention are to determine the thickness of paint, galvanizing or other coatings on the inside of magnetic tubes or conduits.

A further object is to provide a device that will work equally well with different thickness tubes and in different diameter tubes or conduits where a variety of conditions prevail.

These and other objects and advantages residing in the combination, construction and arrangement of parts of the device will become apparent from a consideration of the following specification and claim.

In the drawings,

Fig. 1 is a sectional view of a boiler tube with a device constructed in accordance with this invention in place in the inside of said tube, Fig. 2 is a diagrammatic view of an apparatus constructed in accordance with this invention, Fig. 3 is a partial section view of a modified form of the invention shown in Fig. 1, and Fig. 4 is an end view of a tube illustrating one method of using the multiple magnetic circuit inside of a tube.

In the form of the invention illustrated in Fig. 1, the detector 10 comprises a nonmagnetic casing 12 in which is carried a compact magnetic coil 14 surrounding a magnetic core 16. Attached to the core 16 are members 18 provided with hardened wearing ends 20 which operate in sliding contact with the inner surface of the tube 22. Threaded into the ends of the core 16 are brackets 24 of suitable dielectric material having spaced ears 26 which carry a pin 28.

The structure for guiding the detector 10 through straight and bent tubes and for maintaining the ends 20 in contact with the tube wall comprises a spring 30 looped at the portion 32 around the pin 28. The ends 34 of the spring 30 are provided with bushings 36 for detachably connecting the detector 10 to the bracket 38 through the pin 40. The bracket 38 has a stud portion 42 to which is attached one end of the closely wound coil spring 44. The opposite end of the spring 44 is fixed to the outer end 46 of the shank 48. Connected to the shank 48 is a hexagon head 50 adapted to be urged into a similarly shaped socket 52 by the spring 54. A housing 56 carries the socket 52. The socket 52 is slotted at 58 to receive the end of the flat graduated spring steel tape 60. A removable pin 62 projecting through a hole 64 in the tape 60 holds the same in assembly. To vary the relative angularity between the tape 60 and the head 50, the head 50 is withdrawn from the socket 52 by compressing the spring 54 and then rotating the casing 56 relative to the shank 48 to the desired angularity before permitting the head 50 to be returned in register with the socket 52. This arrangement permits the detector 10 to be shoved or pulled through bent conduits with the ends 20 in contact with any selected portion of the inner wall throughout the length.

In Fig. 2, the electric circuit for the detector 10 is diagrammatically illustrated. The conductors 66 are connected to the windings of the coil 14. An alternating current carried by the conductors 68 and 70 is carried through the switch 72 and divided through the resistance 74 and 76 to be passed through the coils 14 and 78 and the variable resistance 80. By means of the adjustable air gap 82, condensers 84 and 86 and rectifier 88 a very delicate balance can be obtained on the meter 90 with the adjustable resistance 92 giving the desired range. With the illustrated apparatus, it has been found that the thickness of the tube or conduit does not interfere with the measurement of deposits or the determination of the condition of the inner surface.

For example, when the detector 10 is being used for the examination of boiler tubes, the inductance coil 14 and iron core 16 are so arranged that when the alternating current is passed through the winding of the coil 14, a path of a portion of the magnetic flux is through a portion of the tube. By limiting the area of contact of the coil with the tube, a delicate balance can be obtained. As shown in Fig. 1, the wearing ends 20 provide this limited contact.

Any change in the reluctance of the permeability of the magnetic circuit can be determined in several ways. The circuit shown in Fig. 2 is only one of several. The irregular inner surface of ferrous tubes caused by pitting, corrosion or erosion can be readily detected by the balance of the circuits as the abnormal portion of the tube comes in contact with the hardened ends 20. With undamaged tubes and conduits an accurate measure of the scale thickness or other deposit can be readily obtained.

In the case of magnetic scale formation on the surface of tubes, it has been found that by the proper adjustment of the variable resistances 80 and 92, satisfactory results can be obtained.

An arrangement for rotating the detector 102 as it is passed through the tube 104 is illustrated in Fig. 3. The spring 106 carries a series of rollers 108 which engage the inner wall of the tube 104 and urge the contact feet 110 into contact with the inner wall. A bracket 112 connected to the spring 106 connects with a flexible shaft 114 for rotating and advancing the detector 102 in the tube. It is to be understood that the detector 102 is only diagrammatically illustrated in Fig. 3. It may be of similar construction to that shown in Fig. 1 if desired.

Multiple magnetic circuits inside of the tube or conduit, with the coils connected in series or parallel, have been used in the diagrammatic circuit of Fig. 2 and are considered within the scope of this invention. In Fig. 4 is shown a front view of said detector 94 located in the tube 96 and provided with hardened feet 98, each of which is stressed by the spring 100 to maintain all the feet 98 in intimate contact with the tube walls. The means for pushing the detector 94 through the tube 96 may be similar to that shown in Fig. 1.

While it is anticipated that the principal field of usefulness of the present invention is in the inspection of boiler tubes, it is not so limited. For example, it is anticipated that the device may find usefulness for measuring the thickness of enamel or other coatings on the inside of tubes and pipes.

Having thus described my invention, what I desire to secure by Letters Patent and claim is:

A measuring device for determining the amount of corrosion or other foreign deposits on the inner walls of both bent and straight tubes, pipes and the like, comprising an electromagnet unit having opposed pole portions adapted to ride along the inner surface of the tube being measured, a resilient distortable carriage for said electromagnet having resilient portions extending before and after said electromagnet unit and constructed and arranged to urge said electromagnet toward the inner wall of the tube, said resilient portions being adapted to engage the inner wall of the tube opposite that part of the inner wall along which the opposed poles of said electromagnet ride, and distortable means directly connected to said carriage for applying traversing force indirectly to said unit for moving said unit through both straight and bent tubes and the like.

HOWARD L. TURNER.

REFERENCES CITED

The following references are of record in the file of this patent:

UNITED STATES PATENTS

| Number | Name | Date |
| --- | --- | --- |
| 514,514 | Stafford | Feb. 13, 1894 |
| 704,045 | Hyden et al. | July 8, 1902 |
| 1,895,643 | Putnam | Jan. 31, 1933 |
| 2,041,058 | Fossati | May 19, 1936 |
| 2,057,842 | Nielsen | Oct. 20, 1936 |
| 2,104,646 | Greenslade | Jan. 4, 1938 |
| 2,194,229 | Johnston et al. | Mar. 19, 1940 |

FOREIGN PATENTS

| Number | Country | Date |
| --- | --- | --- |
| 368,006 | Great Britain | Mar. 3, 1932 |
| 716,410 | France | Dec. 31, 1931 |